Figure 1:
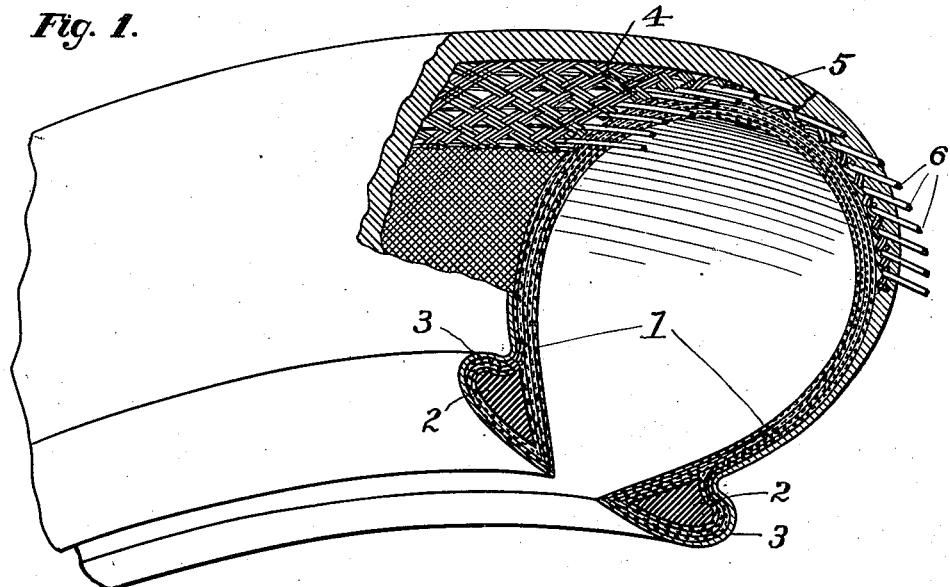

H. Z. COBB.
FABRIC FOR TIRES.
APPLICATION FILED JUNE 20, 1914.

1,201,257.

Patented Oct. 17, 1916.

Witnesses:
Edw. W. Vaill
B. V. Mohan.

Inventor:
Henry Z. Cobb.
by Ernest Hopkinson
his Attorney.

UNITED STATES PATENT OFFICE.

HENRY Z. COBB, OF WINCHESTER, MASSACHUSETTS, ASSIGNOR TO REVERE RUBBER COMPANY, A CORPORATION OF RHODE ISLAND.

FABRIC FOR TIRES.

1,201,257. Specification of Letters Patent. Patented Oct. 17, 1916.

Application filed June 20, 1914. Serial No. 846,245.

*To all whom it may concern:*

Be it known that I, HENRY Z. COBB, a citizen of the United States, residing in Winchester, county of Middlesex, and State of Massachusetts, have invented certain new and useful Improvements in Fabrics for Tires, of which the following is a full, clear, and exact disclosure.

My invention relates to fabrics for tires, and particularly to fabrics for that part of the tire construction known as the "breaker strip," although I do not wish to be limited to that particular use since the fabric is capable of being adapted to the construction of a carcass of a pneumatic tire, and in fact, may be used in any other article of manufacture in which such a fabric is required.

Heretofore in the manufacture of pneumatic tires for automobiles it has been customary to place between the carcass and tread portion of the tire a strip of fabric to strengthen the tread portion of the tire and protect the central portion of the carcass from undue flexion resulting from the successive bendings of the tire caused by the tire continually contacting with and leaving the surface of the roadway upon which the automobile travels. This breaker strip has usually been made of a fabric of somewhat coarser weave than the fabric of the carcass and the strands are of somewhat greater gage than the strands used in the carcass.

The object of my invention is to provide a fabric which will have all the advantages of the usual breaker strip used in automobile tires, but which will at the same time be capable of greater wearing qualities, will add resiliency to the tire, will prevent expansion of the tire circumferentially and will distribute the bending action over a larger area than is the case with an ordinary fabric.

A further object of my invention is to provide a fabric which will have a more firm attachment to the surrounding rubber of the tire, or as is expressed in the trade, will have a greater "friction test."

To this end, my invention comprises, broadly, the introduction into the fabric of a tire, of strands of wire running circumferentially of the tread and interweaving or braiding said strands with transverse strands of fibrous material.

In the present form of my invention this fabric is preferably formed on what is known as a braiding machine in which the transverse strands are braided by the usual sinuously moving shuttles about or between the longitudinal wire strands forming a warp. These longitudinal warp strands may be made of fine braided or twisted wire filaments or of single wires and preferably covered with an outer layer of fibrous material so as to form a structure similar to that known in the electrical art as insulated wire.

Figure 3:
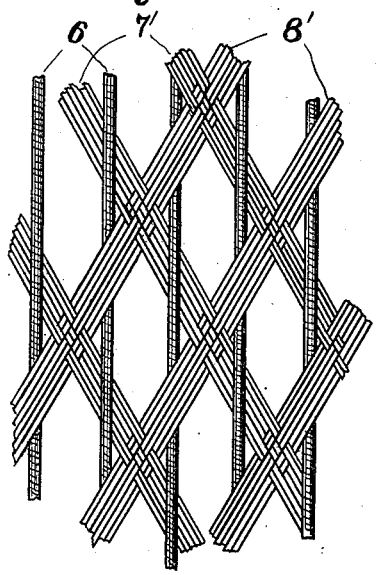
Figure 2:
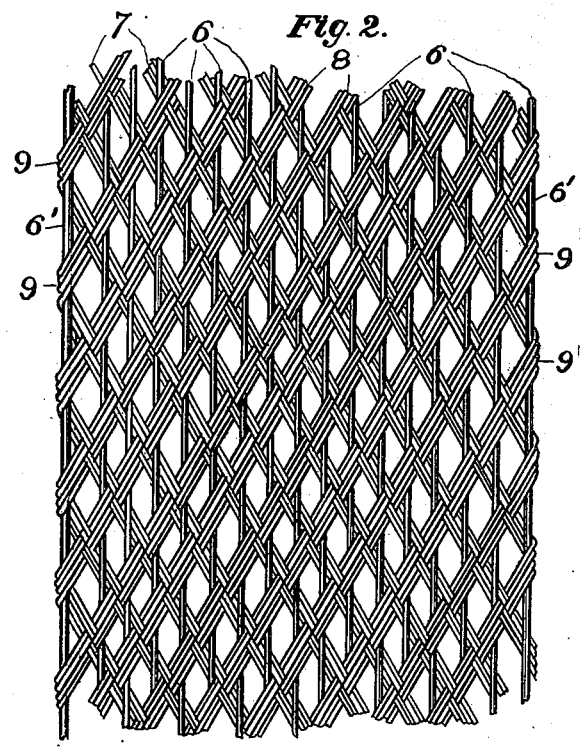

For a detailed description of one form of my invention, which I at present deem preferable, reference may be had to the following specification and to the accompanying drawings forming a part thereof, in which:

Figure 1 is a perspective view of a portion of a tire with parts of the outer covering or tread cut away so as to show the general construction; Fig. 2 is a view showing a portion of my improved fabric; and Fig. 3 is an enlarged view of part of the same, but showing the fibrous strands in sets of six extending obliquely in each direction.

The tire illustrated in Fig. 1 of the drawings is what is known as the usual clencher or quick detachable type of pneumatic tire. This tire is composed of several inner layers of superposed fabric cut on the bias, indicated at 1, and forming the carcass. To the edges of this fabric are attached inextensible beads 2 forming the cores of the clencher edges 3 of the tire. On the tread portion of the carcass so formed is placed my improved breaker strip 4, the same being surrounded with the usual layers of rubber and the cushion strip, as is well known in the art. Over this is placed a tread strip 5 which comes in direct contact with the road surface.

My improved breaker strip consists, first, of longitudinal warp strands 6 composed of wire covered with a winding of cotton or other fibrous thread in the nature of insulated wire above referred to. These are interlaced with obliquely extending weft strands 7 and 8 formed by looping the said strands about the outer warp strands 6', as indicated at 9, thus forming a selvage edge.

In the form of the fabric shown in Fig. 2, I have shown transverse fibrous strands consisting of two sets of strands each made up of two separate strands, and it will be seen that the strands running in one direction are always on one side of the wire warp strands and the strands running in the opposite direction are always on the other side of said warp strands, the pairs of fibrous strands being interwoven where they cross between the warp strands. Of course, it is obvious that different methods and numbers of strands may be used in braiding or weaving the fabric, according to the nature of the finished fabric desired, depending upon its weight, strength, etc., as concerns the size of the tire in which it is to be used. For instance in Fig. 3, I have shown the groups of strands each consisting of six separate strands, these however, being interwoven or intermeshed in pairs at the crossing points between the warp strands. This method gives greater strength to the fabric without materially increasing its thickness.

In the manufacture of this fabric the strands are preferably coated with rubber or rubber solution, or a solution of any other substance used in the manufacture of a tire as the adhesive elastic material. This is accomplished by passing the strands, either just before or just after braiding, through a quantity of rubber solution contained in a tank or other suitable receptacle. By this the strands are not only caused to adhere to each other, but also the fibrous covering of the wire is caused to adhere firmly to the surface of the wire or wires. It will also be noted, that as a result of the method above described, of braiding the fabric in a braiding machine, there is considerable space left between the strands of the wire which produces rather large interstices in the fabric at regular intervals, thus allowing the rubber to thoroughly bind itself about the strands so that the fabric is fixed and firmly embedded in the material of the tire. This produces a much stronger engagement between the carcass and the breaker strip than is possible by any other construction, since the rubber surrounding the breaker strip on both sides is able to integrally unite through the interstices of the fabric.

The fabric being made in strips of substantially the width required for the breaker strip, it becomes unnecessary to cut the fabric except into the requisite lengths to completely cover the carcass longitudinally, thus obviating the usual wide fabrics required when woven cloth is cut into strips on special cloth cutting machines, while at the same time the fabric has all the advantages of square cut woven fabric and will more readily conform to the double curvature of the carcass.

The fabric may be braided or woven as a flat band or ribbon and may then be made to conform to the tread portion of a tire, or if it is desired to make the fabric wider and have it extend a greater distance across the sides of the tire, the fabric may be braided or woven on suitable forms to give a shape approximating that of the tire and then placed in position on the carcass in substantially the shape it would ultimately assume.

It will now be appreciated that since the longitudinal wire strands are embedded firmly in the body of the tire beneath the tread, the tire will have great resiliency without any tendency to expand under pressure of the inner air tube. The wire being somewhat stiffer and more resilient than the ordinary fabric will not decrease the cushioning effect of the tire and yet will increase the efficiency and wearing qualities. Furthermore, it will be plain that owing to the greater stiffness of the longitudinal wire strands, the bending effect of the tire in passing over inequalities or obstacles in the road and while coming in contact with and leaving the road surface, will be distributed over a larger section of the tire and in that way protect the carcass from being worn on fixed lines which heretofore has been the principal cause of so-called "blow-outs."

Having thus described this form of my invention, what I claim and desire to protect by Letters Patent is:

1. A fabric comprising substantially straight warp strands of wire wound with a fibrous thread and transverse intermeshing fibrous strands crossing and separating said warp strands so as to leave interstices between the same, said fabric being impregnated with an elastic adhesive material.

2. A fabric comprising substantially straight warp strands of braided wire covered with fibrous material and transverse oblique intermeshing fibrous strands separating said warp strands and leaving spaces between the same.

3. A fabric comprising substantially straight warp strands of braided wire covered with fibrous material and oblique intermeshing fibrous strands separating said warp strands and leaving spaces between the same, said strands being impregnated with an elastic adhesive material.

4. A braided fabric comprising substantially straight warp strands of wire wound with fibrous thread and sets of intermeshing oblique fibrous strands lying on each side of said warp strands.

5. A braided fabric comprising substantially straight warp strands of braided wire wound with fibrous threads and sets of intermeshing oblique strands lying on each side of said warp strands.

6. A strip of braided fabric comprising substantially straight warp strands of wire wound with threads of fibrous material and transverse oblique intermeshing fibrous strands extending across said strip successively in opposite directions and around the outer warp strands, thereby forming selvage edges.

7. A breaker strip for pneumatic tires comprising substantially straight warp strands of wire and continuous transverse oblique intermeshing fibrous strands engaging said warp strands and separating the same.

8. A breaker strip for pneumatic tires comprising substantially straight warp strands of braided wire and continuous transverse oblique intermeshing fibrous strands engaging said warp strands and separating the same.

9. A breaker for pneumatic tires comprising substantially straight warp strands of braided wire wound with fibrous thread and continuous transverse oblique intermeshing fibrous strands engaging said warp strands and separating the same.

Signed at New York, county of New York, State of New York, this 13th day of May, 1914.

HENRY Z. COBB.

Witnesses:
EDWARD W. VAILL,
F. B. VANDERBILT.